United States Patent
Shachar et al.

(10) Patent No.: US 12,483,442 B2
(45) Date of Patent: Nov. 25, 2025

(54) PREVENTION OF ELECTROMAGNETIC WAVE DETECTION IN A WIRELESS COMMUNICATION NETWORK

(71) Applicant: Dell Products L.P., Round Rock, TX (US)

(72) Inventors: Tomer Shachar, Omer (IL); Yevgeni Gehtman, Modi'in (IL); Maxim Balin, Yavne (IL)

(73) Assignee: Dell Products L.P., Round Rock, TX (US)

( * ) Notice: Subject to any disclaimer, the term of this patent is extended or adjusted under 35 U.S.C. 154(b) by 503 days.

(21) Appl. No.: 17/970,471

(22) Filed: Oct. 20, 2022

(65) Prior Publication Data

US 2024/0137250 A1 Apr. 25, 2024
US 2024/0235894 A9 Jul. 11, 2024

(51) Int. Cl.
*H04L 25/02* (2006.01)

(52) U.S. Cl.
CPC .................................. *H04L 25/02* (2013.01)

(58) Field of Classification Search
CPC ....................................................... H04L 25/02
USPC ........................................................... 455/73
See application file for complete search history.

(56) References Cited

U.S. PATENT DOCUMENTS

| 10,003,374 | B1 * | 6/2018 | Lee ......................... H03F 3/245 |
| 10,439,856 | B1 * | 10/2019 | Ali Shah ............. H04L 27/2607 |
| 2016/0309535 | A1 * | 10/2016 | Myoung ........... H04W 72/0453 |
| 2020/0091944 | A1 * | 3/2020 | Sundström ............ H04L 5/0044 |

OTHER PUBLICATIONS

Guri, Mordechai. "AIR-FI: Generating Covert Wi-Fi Signals from Air-Gapped Computers" [https://arxiv.org/abs/2012.06884] Dec. 12, 2020, 14 pages.

* cited by examiner

*Primary Examiner* — Don N Vo
(74) *Attorney, Agent, or Firm* — Amin, Turocy & Watson, LLP

(57) ABSTRACT

A coherent signal is transmitted to cancel a baseband signal at a baseband frequency generated by a component of a wireless communication device while information corresponding to the baseband signal may be transmitted from the wireless communication device at an upconverted frequency. Generating and transmitting of the coherent signal may be responsive to detecting signal energy of a remotely generated baseband energy that may be generated by a remote sniffing device attempting to eavesdrop, or snoop, and remotely and wirelessly steal information from detecting of the baseband signal's electromagnetic energy. The coherent signal may be transmitted directionally to increase cancellation of the baseband signal at a likely location, or in a likely direction, of the eavesdropping device.

20 Claims, 12 Drawing Sheets

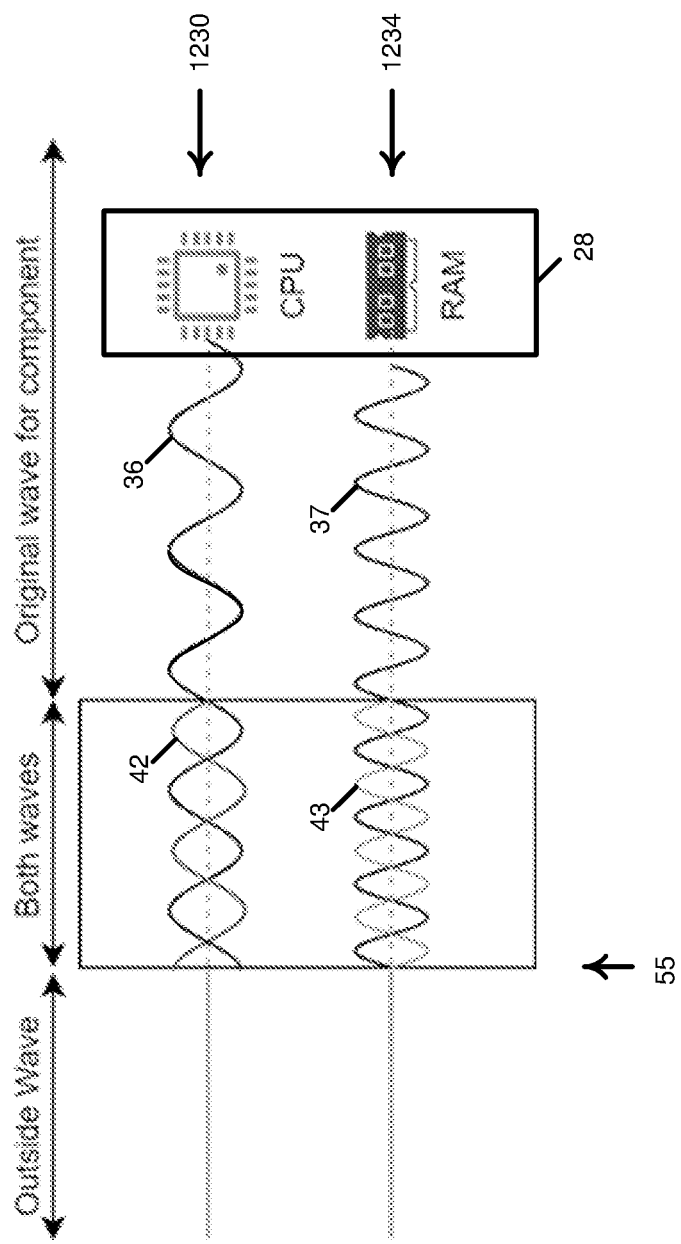

PREVENTION OF ELECTROMAGNETIC WAVE DETECTION IN A WIRELESS COMMUNICATION NETWORK

BACKGROUND

Internet of Things ("IoT") or Of Things ("OT") networks may comprise wireless communication devices, which may be user equipment, and which may detect parameter information with sensors, collect the detected information, process the detected information, and communicate the detected information. IoT devices may communicate the detected information via a wireless communication network, such as data cellular mobile network that may operate according to a fifth generation ("5G") protocol, or other similar communication network. Some 5G networks may comprise privately controlled networks and devices that are operated or used by an institution, an enterprise, a government entity, an industrial site, such as a factory or a campus of factories, a financial site such as a bank or a bank headquarters, and the like. Such a private 5G telecommunications network, and IoT/OT devices that it may comprise, may be an attractive target for data theft. A nefarious actor may be able to steal information from an enterprise or other entity by listening and sniffing electromagnetic signals from IoT/OT devices of the enterprises private wireless network, which signals may be generated by various components (such as memory, a processor, or other components) of IoT/OT devices. An attacker can 'listen' into frequency ranges of the signals' electromagnetic radiation, which may be emitted from internal components of a wireless communication device, such as: a processor a memory, etc.), when operating. A given component of a wireless communication device will typically operate at one or more specific frequencies based on corresponding manufacturing design or corresponding implementation designs. For example, certain processors correspond to certain frequencies or certain memory components correspond to certain frequencies based on clock speeds or other operating frequencies, or system frequencies may depend on interoperation design of components in a wireless communication device. Thus, leakage of data that is processed by a component in an IoT/OT device itself (e.g., by a processor, memory, etc.) is possible before the data is upconverted and transmitted to a cellular data network, such as to a 5G network node, for example, a node of a private corporation's local 5G network.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

In an example embodiment, a method comprises receiving, by a system comprising a first processor, an indication of a baseband signal corresponding to a component associated with a communication device enabled for communication via a communication network, wherein the component comprises at least one of a second processor of the communication device or a memory of the communication device; generating, based on the indication of the baseband signal, a coherent signal that corresponds to the baseband signal; and communicating the coherent signal to a first transceiver to facilitate a transmission of the coherent signal with the first transceiver. The indication of the baseband signal may be a detection, internal with respect to the communication device, of electromagnetic energy emitted from a component of the wireless communication device. The indication of the baseband signal may comprise a message communicated to the first transceiver a configured, known, or detected, frequency of a component of the wireless communication device. The indication of the baseband signal may comprise a detection of remotely generated baseband energy that may be generated by a receiver of, or other components of, a device attempting to snoop, or eavesdrop, information represented by the baseband signal.

The component of the wireless communication device that corresponds to the baseband signal may comprise the memory of the communication device; the baseband signal may emanate from the memory. The component of the wireless communication device that corresponds to the baseband signal may comprise the second processor; the baseband signal may emanate from the second processor.

The communication device may comprise the first transceiver, the baseband signal may correspond to a first frequency, and the method further comprise upconverting an information signal corresponding to the baseband signal to an upconverted information signal corresponding to a second frequency that is different than the first frequency and transmitting the upconverted information signal with the first transceiver according to the second frequency, wherein the transmission of the coherent signal with the first transceiver comprises the transmission of the coherent signal with the first transceiver at the first frequency.

The baseband signal may correspond to a first phase, wherein the baseband signal has a first amplitude within a first proximity of the communication device and a second amplitude outside of the first proximity and within a second proximity of the communication device, wherein the first amplitude is different than the second amplitude, wherein the first proximity is closer than the second proximity, and wherein the transmission of the coherent signal with the first transceiver comprises the transmission of the coherent signal with the first transceiver at a third amplitude, different than the first amplitude and the second amplitude, and at a second phase, different than the first phase, that results in a reduction of the second amplitude within the second proximity to a reduced second amplitude within the second proximity that is less than the second amplitude within the second proximity. The first proximity may be, or may be defined by, a first volume of space inside a housing of the communication device, and wherein the second proximity is defined by a second volume of space outside the housing of the communication device. Transmission of the coherent signal may comprise transmission of the coherent signal with the first transceiver from within the first proximity.

Transmission of the coherent signal comprises a directional transmission of the coherent signal in a specified direction to result in a directional attenuation of the baseband signal, and to result in the baseband signal having a fourth amplitude within a third volume of space of the second proximity that is different than the second amplitude within the second proximity and the reduced second amplitude within the second proximity. In an example, the directionally may reduce the baseband signal energy in a direction away from a building but not reduce the baseband signal within the building, by focusing energy of the coherent signal in a direction toward a suspected location of a sniffing device.

In an embodiment, a transmitter device separate from the communication device comprises the first transceiver, the communication device comprises a second transceiver, and the method further comprises upconverting an information signal corresponding to the baseband signal to an upconverted information signal having a second frequency; and transmitting the upconverted information signal with the second transceiver according to the second frequency, wherein the transmission of the coherent signal with the first transceiver comprises the transmission of the coherent signal with the first transceiver at the first frequency.

In an embodiment, the transmitter device is located outside of a housing of the communication device. In another embodiment, the transmitter device is located inside of a housing of the communication device.

A system embodiment comprises a first transmitter; and a processor, operatively coupled with the first transmitter, the processor configured to: generate a coherent signal that corresponds to a baseband signal that emanates from a component associated with an Internet of Things device; and cause the first transmitter to transmit the coherent signal.

In an embodiment, the system is the Internet of Things device, and the component is at least one of a processor or a memory of the Internet of Things device. In another embodiment, the system is an attenuating device that is separate from the Internet of Things device, and the component is at least one of a processor or a memory of the Internet of Things device.

In an embodiment, the baseband signal has a first phase, wherein the baseband signal has a first amplitude within a first range of a location of the Internet of Things device and a second amplitude within a second range of the location of the Internet of Things device, wherein the second range is outside of the first range, and wherein generation of the coherent signal comprises the generation of the coherent signal to be at a specified frequency, at a second phase, and at a third amplitude to attenuate the second amplitude within the second range. In an example, the first range may be a volume, or space, within a housing of the IoT device and the second range is a volume of space outside the housing.

The processor is further configured to receive an indication of the baseband signal that comprises information corresponding to a frequency at which the baseband signal emanates from the Internet of Things device as a result of the component operating. The indication may be a manually provided indication, the indication may be determined by a component of the IoT device, or the indication may be detected by a component of the IoT device.

An example non-transitory machine-readable medium, comprises executable instructions that, when executed by a processor, facilitate performance of operations, comprising: determining a baseband signal emanating from operation of an internal component of a user device, wherein the baseband signal has a first frequency and a first phase, and wherein the baseband signal has a first amplitude at a first distance from the user device and a second amplitude at a second distance from the user device; detecting remotely generated baseband energy corresponding to the baseband signal; (e.g., energy generated by a sniffing device attempting to eavesdrop on the user device by performing radio processing operations at the first frequency); responsive to the detecting of the remotely generated baseband energy, generating a coherent signal that corresponds to the baseband signal; and transmitting the coherent signal via a first transmitter at the first frequency, at a second phase, and at a third amplitude to reduce the second amplitude at the second distance to the third amplitude at the second distance.

The operations may further comprise: upconverting the baseband signal to result in an upconverted information signal having a second frequency (e.g., within a 5G radio access range of frequencies); transmitting the upconverted information signal via the first transmitter according to the second frequency; and transmitting the coherent signal via the first transmitter at the first frequency, wherein the user device comprises the first transmitter, the processor, and the internal component of the user device.

In an embodiment, the internal component of the user device from which the baseband signal emanates may be the processor and the operations may further comprise: determining the first frequency of the baseband signal based on a clock speed of the processor.

In an embodiment, the operations may further comprise: receiving first location data indicating a first location of the first transmitter; receiving second location data indicating a second location of the user device; and determining the second phase and the third amplitude based on the first location and the second location. This embodiment may be useful if the first transmitter is located externally with respect to the user device so that the second phase of the coherent signal may be adjusted relative to the first phase of the baseband signal to achieve satisfactory reduction, or attenuation, of the baseband signal at a location of a snooping device attempting to eavesdrop on information being processed at the user device.

In an embodiment, the user device may comprise the first transmitter and a second transmitter, and wherein the operations further comprise: upconverting the baseband signal to an upconverted baseband signal having a second frequency (for transmission according to a protocol such as a 5G protocol); and transmitting the upconverted baseband signal at the second frequency via the second transmitter.

BRIEF DESCRIPTION OF THE DRAWINGS

FIG. 3 illustrates baseband signals emanating from components of a wireless communication device.

DETAILED DESCRIPTION

Figure 1:
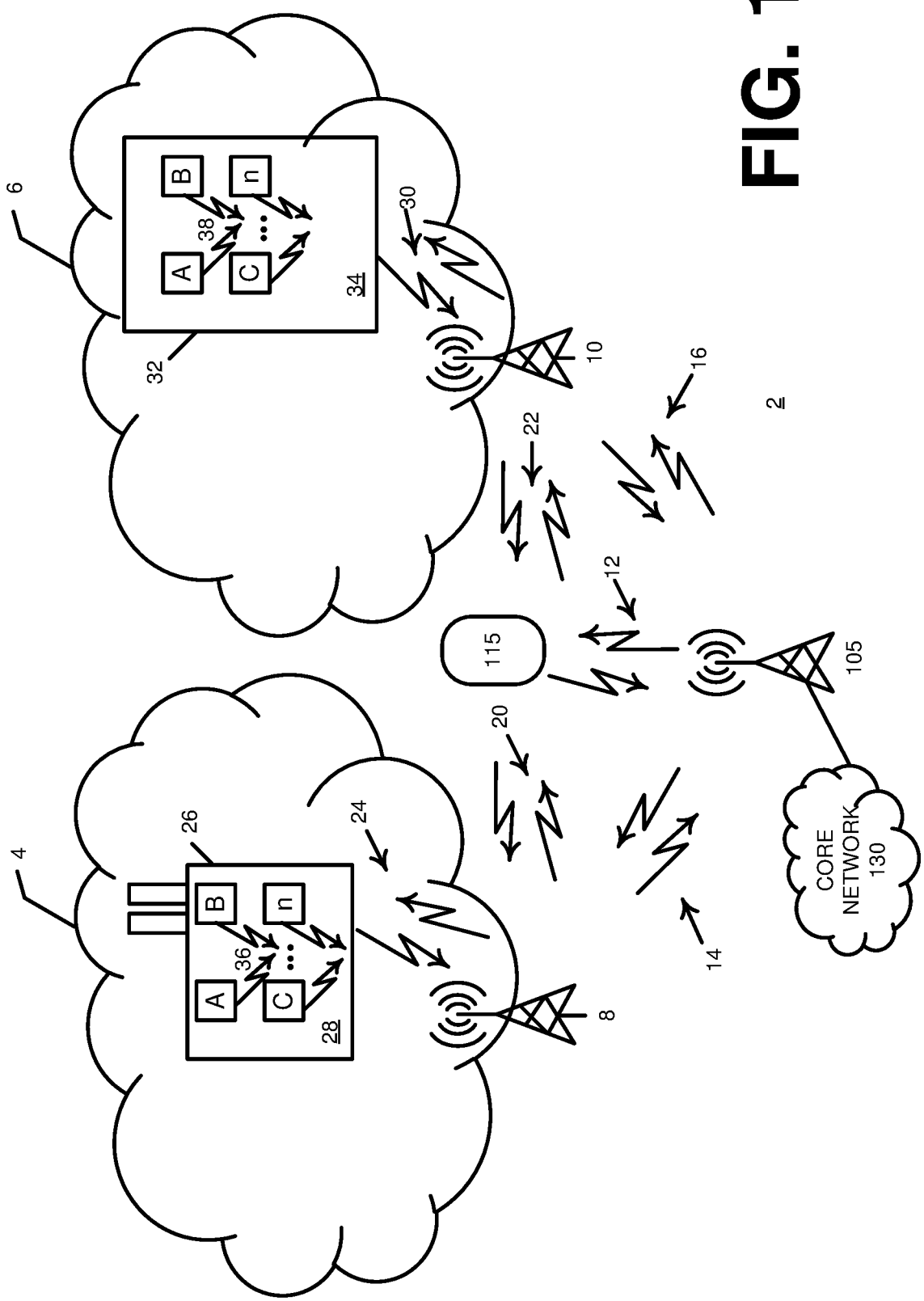
FIG. 1 illustrates an example environment with multiple wireless communication networks that comprise wireless communication devices.

As a preliminary matter, it will be readily understood by those persons skilled in the art that the present embodiments are susceptible of broad utility and application. Many methods, embodiments, and adaptations of the present application other than those herein described as well as many variations, modifications and equivalent arrangements, will be apparent from or reasonably suggested by the substance or scope of the various embodiments of the present application.

Accordingly, while the present application has been described herein in detail in relation to various embodiments, it is to be understood that this disclosure is illustrative of one or more concepts expressed by the various example embodiments and is made merely for the purposes of providing a full and enabling disclosure. The following disclosure is not intended nor is to be construed to limit the present application or otherwise exclude any such other embodiments, adaptations, variations, modifications and equivalent arrangements, the present embodiments described herein being limited only by the claims appended hereto and the equivalents thereof.

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

The term "facilitate" as used herein is in the context of a system, device or component "facilitating" one or more actions or operations, in respect of the nature of complex computing environments in which multiple components and/or multiple devices can be involved in some computing operations. Non-limiting examples of actions that may or may not involve multiple components and/or multiple devices comprise transmitting or receiving data, establishing a connection between devices, determining intermediate results toward obtaining a result, etc. In this regard, a computing device or component can facilitate an operation by playing any part in accomplishing the operation. When operations of a component are described herein, it is thus to be understood that where the operations are described as facilitated by the component, the operations can be optionally completed with the cooperation of one or more other computing devices or components, such as, but not limited to, sensors, antennae, audio and/or visual output devices, other devices, etc.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Destructive wave interference may facilitate a virtual faraday cage for defensive purposes to cancel a baseband signal emanating from a component of a wireless communication device without cancelling upconverted signals that are transmitted by a transceiver to a node device of a communication network, for example, a private 5G network. Thus, legitimate operation of the communication network continues without the ability for external sniffer devices to meaningfully detect energy of a baseband signal that may be emitted from a component of a wireless communication device of the network. Because a processor, memory, or other computational component of an IoT device emits electromagnetic waves at frequencies specific to the respective components, receivers, tuned to a frequency that corresponds to a frequency of a baseband signal emitted from a IoT device's component, may be able capture information or data represented by the baseband signal energy. By generating and transmitting a destructive electromagnetic wave, or signal, at a frequency of the baseband signal emitted by a device's component, interference (e.g., by interaction of waves that are superposed and either correlated or coherent with each other) reduces or eliminates the ability of a receiver/sniffer device that is located a distance from the IoT. In an example, determining a frequency of a baseband signal emitted by a component of an IoT device and transmitting another signal, which may be referred to as a coherent signa, that is a sine wave, for example, that is 180° out-of-phase with the baseband signal at the location of the receiver/sniffer device reduces, or eliminates an amplitude of the baseband signal at the location of the receiver/sniffer device and thus reduces or eliminates the ability of the receiver/sniffer device to detect the baseband signal and detect, discern, or otherwise retrieve information therefrom.

In an example, a transmitter transmits a wave, or signal, at a frequency of an energy signal emitted by a component of a wireless communication device to block energy of the emitted wave using an opposite phase signal at the same frequency of the component (e.g., uses a destructive wave). Because components, such as a central processing unit ("CPU"), e.g., a processor, or a random access memory ("RAM") e.g., a memory, of an IoT communication device, which may be a wireless device, are known, an operator of the IoT device, and network of which it is part, can provide the frequencies, or frequency ranges, to the transmitter. Then, frequencies can be 'learned' automatically by the transmitter or may be communicated to the transmitter from a processor of the IoT device that can determine frequencies at which components of the IoT device operate.

Transmitting the opposite phase wave does not harm the components of the IoT device themselves because when an electric current, electromagnetic force, or mechanical spin is applied or generated by a component, that component naturally acts as a transmitter. Thus, the component does not act as, or diminishes its ability to be, a receiver (besides the physics aspect of a component acting as a transmitter and not as a receiver simultaneously, additional physical components are needed to convert the transmitter to a receiver, such as an antenna or an amplifier). An additional benefit of canceling, or destroying, the baseband signal energy emitted from a component of an IoT device is a reduction of electromagnetic fields and their respective electromagnetic waves in the private network, which may reduce adverse impact of a device's performance in terms of network connectivity and communication data rate.

In an embodiment, a custom, virtual Faraday cage may be implemented to act as a directional virtual Faraday cage (e.g., not omni-directional) by directing a canceling, or destructive, coherent wave, or signal, in a directional manner toward a potential receiver/sniffer device that may be at a location that can detect energy from a baseband signal emitted from a component of an IoT device of communication network, such as a private 5G cellular network. By transmitting a coherent signal in a directional manner from a first location, more energy of the coherent signal may reach the snooping receiver/sniffer device at a second location than if the coherent cancelling wave were transmitted in an omnidirectional manner. In addition, transmitting a coherent cancelling wave in a directional manner to reduce energy of a baseband signal emitted from an IoT device may reduce energy of the coherent signal, which corresponds to a frequency of the baseband signal, from pervading a space in which other IoT devices of the private network operate. A further benefit of transmitting the coherent signal in a directional manner is that that an operator of the private network, or a transmitter device that transmits the coherent signal, can "control" incoming/outgoing energy transmissions, which control may facilitate inspection and analysis of electromagnetic signal energy to determine whether a snooping receiver/sniffer device is attempting surreptitious detecting of private information that may be represented by a baseband signal emitted from a component of an IoT device of the private network.

After detecting and analyzing signal energy that may be emitted from a sniffer device (energy may inherently be emitted from the sniffer device at a frequency of a baseband signal because of operation of the sniffer's own internal components while tuned to detect energy of the baseband signal emitted from the IoT device of the private network) the IoT device's CPU or memory working frequency, or frequencies, may be modified, or adjusted, constantly or as needed to cancel signal energy of the baseband signal emitted from the IoT device to prevent success of the attempted data attack by the receiver/sniffer device.

To generate destructive coherent interference, or signals, frequencies of the IoT radio frequency (RF) emissions are known, or at least 'predicted', because the IoT device 'knows' operating frequencies of its components, or a user/operator of a network, such as a network engineer, knows how components of a given IoT device are configured. Frequencies determined from such information can be manually or automatically communicated to a transmitter that transmits a destructive coherent wave, or signal to cancel baseband signal energy emitted from an IoT device. Thus, the 'known' frequency ranges may provide a starting point, or prediction, for a frequency, frequencies, or a range of frequencies, to begin detecting energy emitted from a receiver/sniffer that is trying to snoop and detect information contained in a baseband signal emitted from an IoT device. By transmitting a destructive coherent wave, or signal, based on a frequency of an IoT device, the emitted baseband signal may be blocked to prevent external sources from capturing the baseband signal information while allowing transmission of the information that is upconverted as electromagnetic waves in frequency ranges corresponding to a protocol of the private communication network, for example, a 5G private network, in an area in which the IoT is designed to transmit, such as space between the IoT device and a node corresponding to the private communication network, which may be referred to as a 'Trust Zone'.

A Faraday cage typically comprises a metallic enclosure used to block electromagnetic fields. A virtual Faraday cage, as disclosed in reference to one or more example embodiments herein, blocks electromagnetic energy outwardly propagating from an IoT device instead of blocking inwardly propagating energy by nullifying known electromagnetic wave energy using a transmitter that transmits a coherent wave. The coherent wave may be transmitted from within the IoT/OT device's case, or housing, or may be transmitted by a transmitter located outside of the IoT devices case or housing. In the case of the transmitter transmitting the coherent wave from within an IoT devices housing, the housing may be thought of as the 'faraday cage' whereas in a case where a transmitter external to an IoT device may be used to transmit the coherent signal, the location of the external transmitter, and a range of a coherent signal transmitted therefrom, may define the 'virtual faraday cage.'

By nullifying electromagnetic wave energy of a baseband signal generated by a component of an IoT device within the virtual faraday cage, the baseband signal's phase may be substantially 0°, or an amplitude of the baseband signal energy outside of the virtual faraday cage may be zero or substantially zero, or below a noise level in a range or at a distance outside the virtual faraday cage, so that the baseband signal energy is not detectable by a sniffer device.

Turning now to the figures, FIG. 1 illustrates a communications networking environment 2 that may comprise wireless network 4 and wireless network 6. Wireless network 4 and wireless network 6 may correspond to wireless node 8 and wireless node 10. Wireless nodes 8 and 10 may be local 5G new radio ("NR") nodes that communicate with radio access network ("RAN") node 105, which may be a node of a radio access network that is coupled with core network 130. RAN node 105 may communicate with user equipment 115, such as a smartphone, a tablet, and the like via wireless links 12. RAN node 105 may communicate with local node 8 via communication links 14 and the RAN node 105 may communicate with local node 10 via communication links 16. The user equipment 115 may communicate with local node 8 via communication links 20 and the user equipment 115 may communicate with local node 10 via communication links 22.

Figure 12:
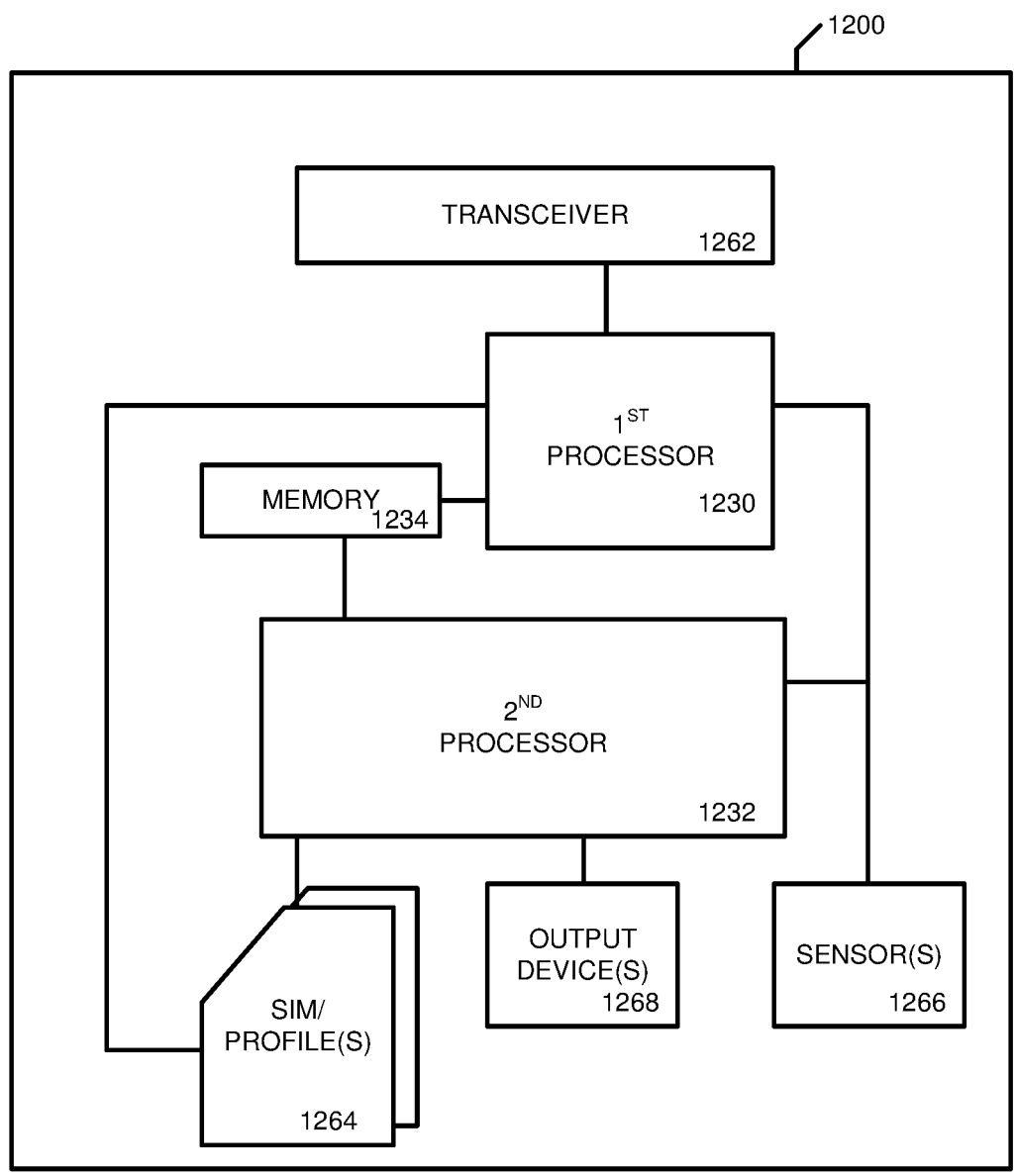
FIG. 12 illustrates a block diagram of an example wireless communication device.

Wireless network 4 and wireless network 6, and respective corresponding wireless node 8 and wireless node 10, may correspond to enterprise 26 and enterprise 32, respectively. Enterprise 26 is represented in FIG. 1 with smokestack to indicate a factory and enterprise 32 is represented as a rectangle to indicate a business building, perhaps located in an urban setting. It will be appreciated that wireless network 4 and wireless network 6 may correspond to other types of use, not just businesses, but may correspond to sports arenas, residential dwellings, shopping areas, and the like. Wireless network 4 and wireless network 6 may comprise multiple wireless communication devices 28A . . . 28*n*, and 34 . . . 34*n*, respectively. Wireless communication devices 28 and 34, as well as user equipment 115, may comprise components illustrated in FIG. 12. It will be appreciated that FIG. 12 illustrates example components and that devices 28, 34, and 115 may comprise more, less, or different components than the example components illustrated in FIG. 12. Wireless network 4 and wireless network 6 may communicate with respectively corresponding local nodes 8 and 10 via wireless communication links 24 and 30, respectively. Wireless communication links 24 and 30 may communicate information from devices 28 and 34, respectively, to local nodes 8 and 10, respectively, via upconverted information signals that have an upconverted frequency in a range specified by a wireless communication protocol standard, such as frequency ranges, for example, 410 MHz-7125 MHz or 24250 MHz-71000 MHz. Devices 28 and 34 may comprise Internet of Things devices, and may include sensors that monitor and detect parameters, such as temperature, moisture, vibration, orientation, images (e.g., a camera), acoustic energy (e.g., a microphone), and the like, and wirelessly transmit information corresponding to the detected parameters, to local nodes 8 and 10 for further communication thereby to user equipment 115 or RAN node 105.

In addition to communicating wireless signals, which may contain parameter information, at an upconverted frequency, which may be referred to as a second frequency, components of devices 28 or 34, such as processors or memory components, may generate and emit electromagnetic radiation 36 or electromagnetic radiation 38, respectively, at baseband frequencies corresponding to respective device 28 or 34. A baseband frequency may be referred to as a first frequency and baseband electromagnetic radiation may be referred to as a baseband signals. Accordingly, in reference to FIG. 1, baseband signals 36 or 38 may refer to baseband electromagnetic radiation 36 or 38. A baseband signal may comprise the same parameter information, or other information, that are transmitted from devices 28 or 34 at the second, or upconverted, frequency. A baseband signal may be generated at a clock frequency of a processor of memory of devices 28 or 34. A user equipment 115 may be close enough to a wireless communication device 28 or 34 to detect baseband electromagnetic radiation emitted therefrom by detecting electromagnetic radiation 36 or 38 and baseband frequencies thereof. Unlike information contained in upconverted signals 24 or 30 that may be encrypted and difficult for a bad actor using a user equipment, such as user equipment 115, to intercept and decode, the information contained in baseband signals 36 or 38 may not be encrypted and thus easy for a bad actor to intercept and decode.

Figure 2A:
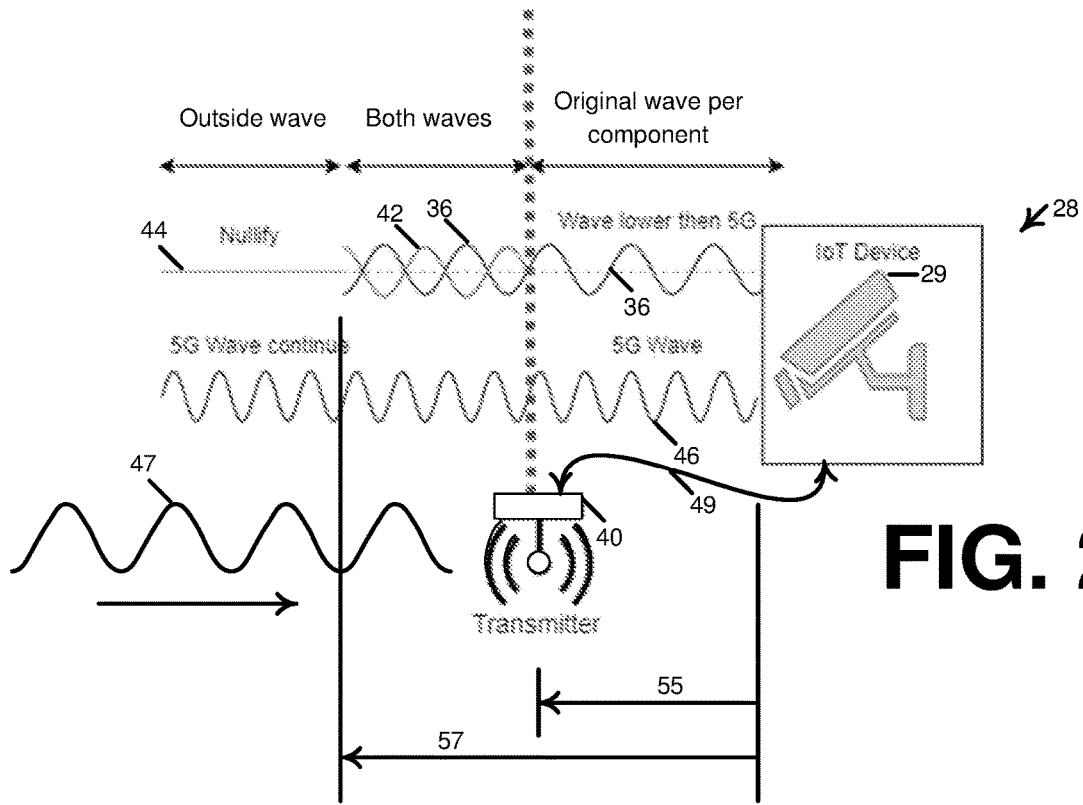
FIG. 2A illustrates an example Internet of Things ("IoT") wireless communication device and a transmitter that attenuates a baseband signal emitted by the IoT wireless communication device.
Figure 2B:
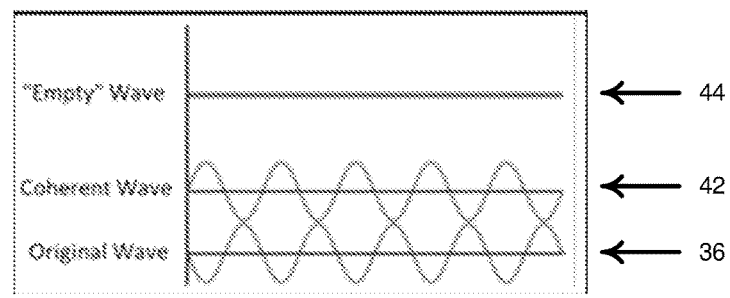
FIG. 2B illustrates an attenuation of a signal by an out-of-phase coherent wave.

Turning now to FIG. 2A, the figure illustrates a wireless user device 28, which is shown as containing a camera, or image sensor 29, in the figure, emitting a baseband signal 36 and transmitting an upconverted information signal 46. Transmitter 40, which is shown separate from, and outside of a housing of, device 28 transmits a coherent signal 42 at a frequency and phase to cancel energy of baseband signal 36 beyond distance 55 from device housing 28. Information in the baseband signal may comprise one or more images generated by camera/image sensor 29. FIG. 2B shows a graphical representation of the effect of transmitter 40 shown in FIG. 2A transmitting coherent signal 42 to result in canceled signal 44, or empty signal 44 (e.g., no information discernable from the canceled signal). Accordingly, transmitting, with transmitter 40, coherent signal 42 at substantially the same amplitude and frequency as baseband signal 36, but at a phase that cancels the baseband signal beyond distance 55, in effect implements a 'virtual faraday cage' beyond distance 55 that is selective insofar as signal energy corresponding to upconverted information signal 46, which is a signal that is being transmitted to a local node by IoT device 28, is unattenuated beyond distance 55, but baseband signal energy is attenuated outside of the virtual 'faraday cage' at distance 55.

It will be appreciated that attempting to detect baseband signal energy from wireless communication device 28 with a device, such as user equipment 115 shown in FIG. 1, may result in the user equipment, or a sniffer device, itself emitting energy at a frequency of the baseband signal as a result of circuitry of the sniffer device being used to detect the baseband signal energy. Such energy generated by, or reflected by, user equipment 116 may be referred to as remotely generated baseband energy 47. Transmitter 40, which may comprise receiver circuitry in addition to transmitter circuitry, and thus may be referred to as a transceiver, may be configured to detect remotely generated baseband energy 47 that is generated by, or reflected by, a user equipment that is snooping, sniffing, or otherwise trying to perform unauthorized detection of information corresponding to the baseband signal that is emitted from wireless communication device 28. Detecting of remotely generated baseband signal energy 47 at a frequency that corresponds to baseband signal 36, or is substantially the same as a frequency thereof, may be communicated via communication link 49, which may be wired or wireless, from transmitter/transceiver 40 to a processor of device 28 as a trigger, or with a trigger instruction, to change a frequency of a component that is causing the emission of baseband signal 36. It will be appreciated that the remotely generated baseband signal energy may result from detecting, or attempting to detect, by a component of user equipment 115, baseband signal 36. It will be appreciated that transmitter, or transceiver, 40 may be part of wireless communication device 28 and may be enclosed by a housing of the wireless communication device. In an embodiment, transmitter, or transceiver, 40 may be a stand-alone device that is separate from device 28 and that is located outside a housing thereof. In an embodiment, a transceiver of wireless user equipment device 28 that is used to transmit upconverted information signals from device 28 may perform functionality of transceiver 40 and may transmit coherent signal 36 as well as upconverted signal 46.

Turning now to FIG. 3, the figure illustrates components of a wireless communication device 28 creating baseband signals at baseband frequencies and being cancelled by coherent signals such that the baseband signals are effectively cancelled beyond a distance 55. Thus, in effect, a virtual Faraday cage is created that blocks emission of baseband signals beyond distance 55, which baseband signals may be produced by components of wireless communication device 28. In an embodiment, processor 1230 may operate at a clock frequency that results in the production or generation of baseband signal 36 based thereon. A transmitter, such as transmitter/transceiver 40 described in reference to other figures herein, may generate coherent signal 42 such that baseband signal is 36 is cancelled beyond a distance 55 relative to wireless communication device 28. In another embodiment, memory 1234 may operate at a frequency that results in the generation of baseband signal 37, which may be cancelled by coherent signal 43 such that baseband signal energy does not extend beyond distance 55. It will be appreciated that distance 55 may correspond to, or may be based on, the location of transmitter/transceiver 40.

Figure 4A:
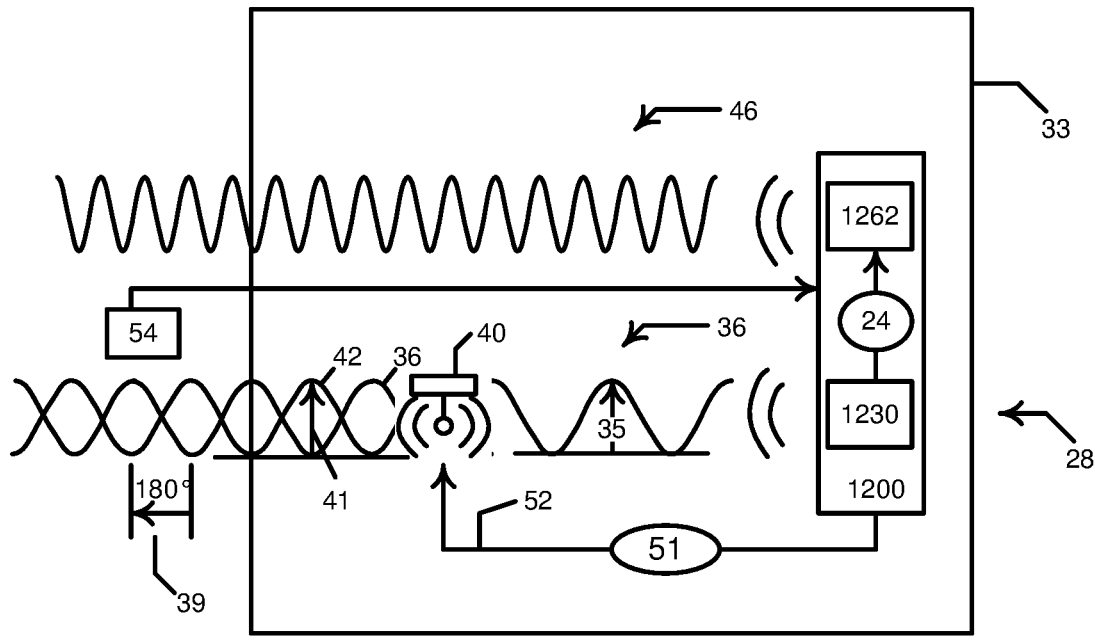
FIG. 4A illustrates an embodiment IoT device with a transmitter located inside a housing thereof attenuating a baseband signal.

Turning now to FIG. 4A, the figure illustrates an embodiment of a wireless communication device 28 that comprises transceiver 1262 and processor 1230. Processor 1230 communicates information 24 to transceiver 1262 for transmission via an upconverted signal 46 at an upconverted frequency according to a wireless communication protocol that may correspond to 5G or similar radio transmission to a wireless communication node, such as, for example, local node 8 or RAN node 105 as shown in FIG. 1. Processor 1230 emits baseband signal 36 based on, for example, a processor clock speed. Baseband signal 36 is shown being emitted by processor 1230 at a first amplitude 35. Transmitter/transceiver 40 is shown located inside a housing of device 28. Housing 33 of device 28 may be viewed as the box that surrounds device 1200 and transmitter/transceiver 40 (as well as other components that device 28 may comprise, such as an image sensor, that are not shown in FIG. 4A or 4B). Terminology, including a 'first distance', a 'first range', or a 'first volume' may correspond to space inside of a housing 33 of device 28 or may correspond to space or distance between transceiver 1262 and transmitter/transceiver 40. Terminology including a 'second distance', a 'second range', or a 'second volume' may correspond to space outside of a housing 33 of device 28 or may correspond to space or distance beyond transmitter/transceiver 40 with respect to the transmitter/transceiver in a space or distance in which the transmitter/transceiver transmits coherent signal 42.

Figure 4B:
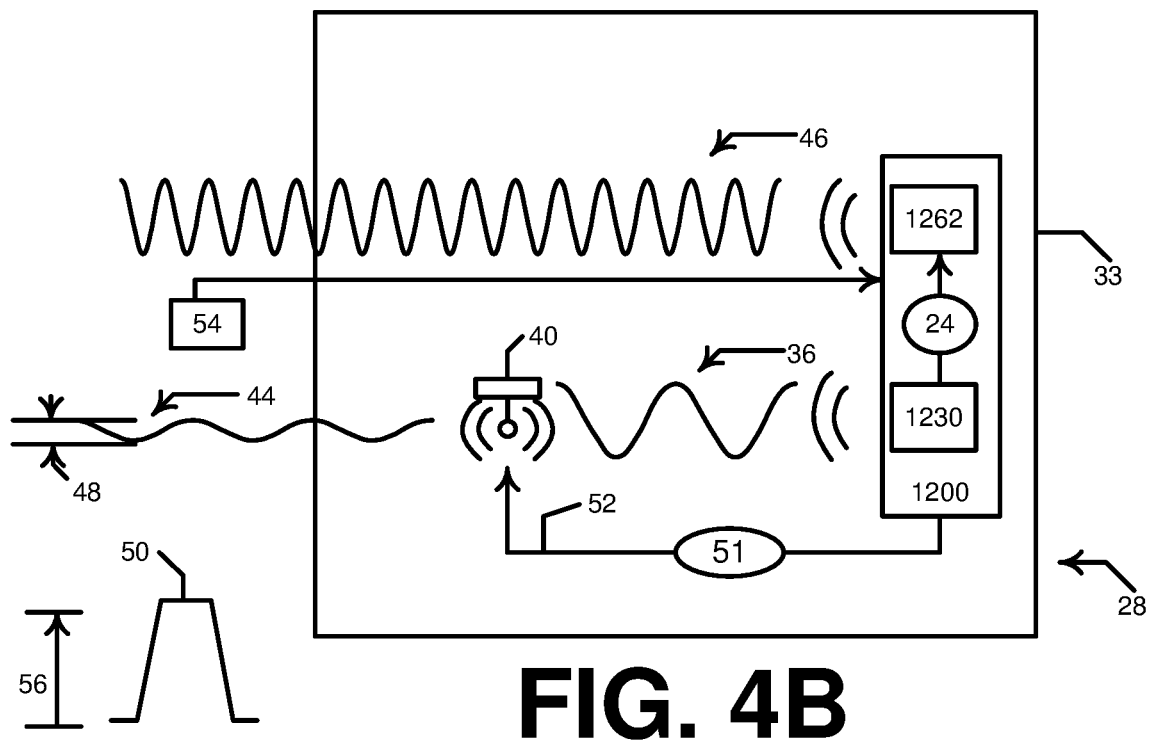
FIG. 4B illustrates the embodiment IoT device of FIG. 4A with a baseband signal thereof having been attenuated.

Device 28 is shown comprising transmitter/transceiver 40, which may be instructed to configure, may be directed to configure, by processor 1230, for example, via a configuration message 52, or may be determined to be configured, to transmit a coherent signal 42 at an amplitude 41 and a second phase 39. Phase 39 may comprise a phase shift of 180 degrees relative to a first phase of first signal 36, but may be a different phase shift relative to the first signal. Amplitude 41 may be the same amplitude as amplitude 35 or may be different to reduce the amplitude of baseband signal 36 to result in reduced amplitude 44 as shown in FIG. 4B. Detector 54 may detect reduced amplitude 44 and may communicate a reduced amplitude indication of the detected reduced amplitude to processor 1230, or another processor of device 1200, to instruct transmitter/transceiver 40 to adjust amplitude 41 or phase 39 to adjust amplitude 44, typically to achieve a lower amplitude 44 than before sensor 54 transmitted a previous measurement of amplitude 44 via the reduced amplitude message. Device 28 may comprise sensor/detector 54, or the detector may be a separate device that is communicatively coupled with a component of device 1200, for example. In an embodiment, detector 54 may detect remotely generated baseband signal energy 47 as described in reference to FIG. 2A and may communicate an indication of such detection as a trigger to a component of device 1200, or to another component of device 28, to perform a mitigation action, such as, for example, a change of a frequency of processor 1230 so that baseband signal 36 may be emitted at a different frequency than a current frequency to which an unauthorized detecting device is currently tuned, or, is attempting to use, to detect baseband signal 36.

FIG. 4B shows reduced amplitude signal 44 having an amplitude 48 that is less than an amplitude 56 of noise signal 50 such that amplitude 56 of noise 50 may be a criterion for determining whether detector 54 should instruct device 1200 to further adjust a phase or amplitude of a coherent signal to further reduce amplitude 48 below amplitude 56. A processor of device 1200 may communicate a message 51, which may comprise an adjustment message with an instruction to adjust a phase or amplitude of coherent signal 42, to transmitter/transceiver 40 via a communication link 52, which may be a wired or a wireless communication link.

Figure 5A:
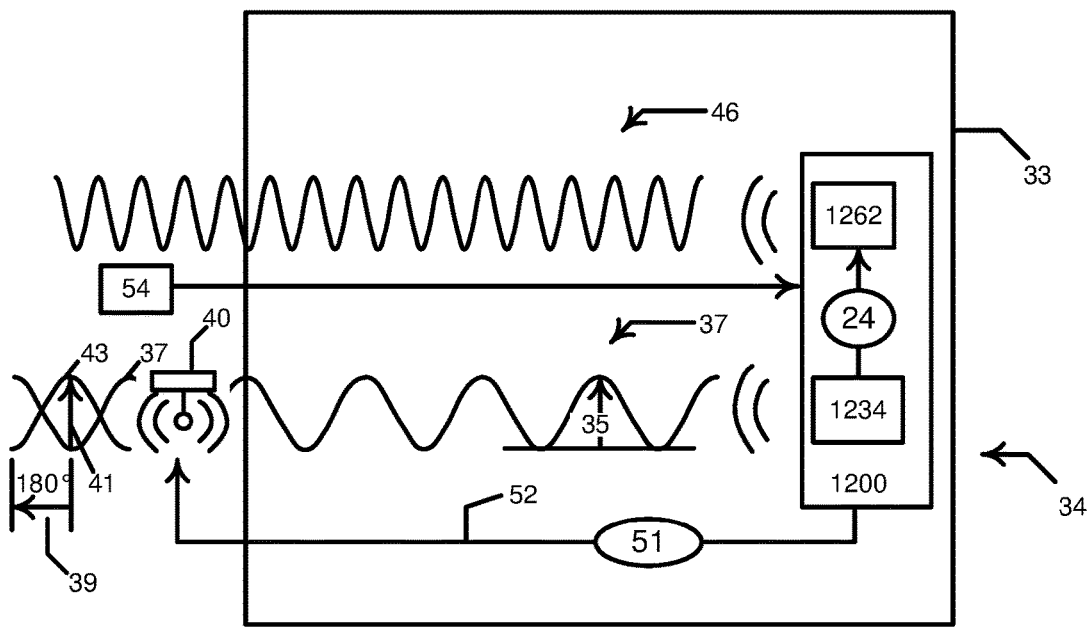
FIG. 5A illustrates an embodiment IoT device with a transmitter located outside a housing thereof attenuating a baseband signal.

Turning now to FIG. 5A, the figure illustrates an embodiment of a wireless communication device 34 that comprises transceiver 1262 and memory 1234. Memory 1234 communicates information 24 to transceiver 1262 for transmission via an upconverted signal 46 at an upconverted frequency according to a wireless communication protocol that may correspond to 5G or similar radio transmission to a wireless communication node, such as, for example, local node 8 or RAN node 105 as shown in FIG. 1. Memory 1234 emits baseband signal 36 based on, for example, a memory clock speed. Baseband signal 37 is shown being emitted from memory 1234 at a first amplitude 35. Transmitter/transceiver 40 is shown located outside of a housing 33 of device 34. Housing 33 of device 34 may be viewed as the box in the figure that surrounds device 1200 (and other components that device 34 may comprise, such as an image sensor, which are not shown in FIG. 5A or 5B). Terminology, including a 'first distance', a 'first range', or a 'first volume' may correspond to space inside of housing 33 of device 34 or may correspond to space or distance between transceiver 1262 and transmitter/transceiver 40. Terminology including a 'second distance', a 'second range', or a 'second volume' may correspond to space in which the transmitter/transceiver transmits coherent signal 43 outside of a housing of device 34 at a distance beyond transmitter/transceiver 40.

Figure 5B:
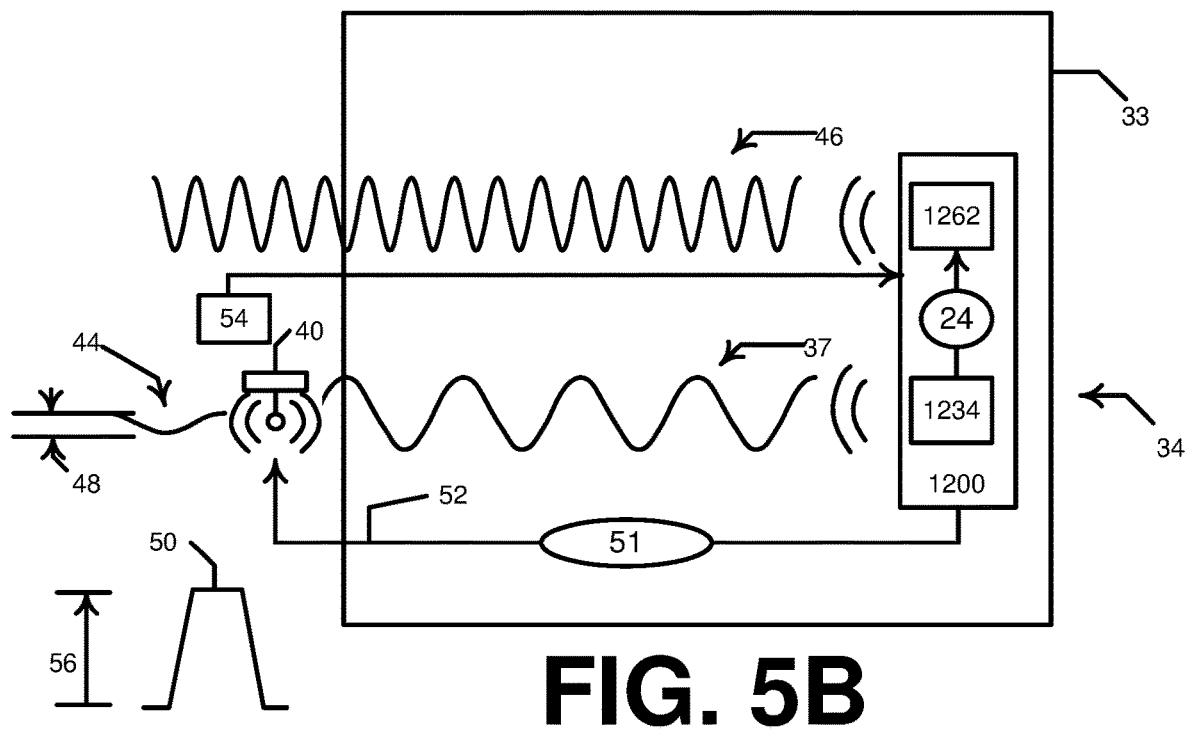
FIG. 5B illustrates the embodiment IoT device of FIG. 5A with a baseband signal thereof having been attenuated.

Transmitter/transceiver 40 may be instructed to configure, may be directed to configure, or may determine to configure, memory 1234 via a configuration message 52, to transmit coherent signal 43 at an amplitude 41 and a second phase 39. Phase 39 may comprise a phase shift of 180 degrees relative to a phase of first signal, or baseband signal 37, but may be a different phase shift relative to the first/baseband signal. Amplitude 41 may be the same amplitude as amplitude 35, or may be a different amplitude to reduce the amplitude of baseband signal 37 to a reduced amplitude 44 as shown in FIG. 5B Detector 54 may detect reduced amplitude 48 of reduced signal 44 and may provide an indication of the detected reduced amplitude to memory 1234, or another component of device 1200, to instruct transmitter/transceiver 40 to adjust amplitude 41 or phase 39 to cause an adjustment of amplitude 48, typically to achieve a lower amplitude 48 than before sensor 54 transmitted, or otherwise communicated, the indication of amplitude 48. Device 34 may comprise sensor/detector 54, or the detector may be a separate device that is communicatively coupled with component of device 1200 shown in FIG. 12. In an embodiment, detector 54 shown in FIGS. 5A and 5B may detect remotely generated baseband signal energy 47 as described in reference to FIG. 2A and provide an indication of such detection as a trigger to device 1200 to perform a mitigation action, such as, for example, to change a clock speed of memory 1234 so that baseband signal 36 may be emitted at a different frequency than a current frequency to which an unauthorized detecting device is currently tuned to, or, is attempting to use, to detect baseband signal 36.

FIG. 5B shows reduced amplitude signal 44 having an amplitude 48 that is less than amplitude 56 of noise signal 50 such that amplitude 56 of noise 50 may be a criterion for determining whether detector 54 should instruct a component of device 34 or device 1200 to further adjust a phase or amplitude of coherent signal 43 to further reduce amplitude 48. A processor of device 1200 may communicate an adjustment message 51, which may comprise an instruction to adjust a phase or amplitude of coherent signal 43, to transmitter/transceiver 40 via a communication link 52, which may be a wired or a wireless communication link.

It will be appreciated that the embodiment shown in FIGS. 5A and 5B is similar to the embodiment described in reference to FIGS. 4A and 4B with transmitter/transceiver 40 being shown outside of a housing of wireless communication device 34 instead of inside the housing. Furthermore, memory 1234 is shown emitting baseband signal 37 instead of processor 1230 emitting baseband signal 36 as shown in FIG. 4A. It will be appreciated that devices 34 being part of network 6 instead of network 4 as shown in FIG. 1, and memory 1234 emitting baseband signal 37 instead of processor 1230 emitting baseband signal 36 as shown in FIG. 4A are shown merely to highlight different devices of FIG. 1 and to highlight different components thereof as emitting baseband signals 36 or 37, but are not meant to imply that only memory components of devices 34 emit baseband signals or that only processors of devices 28 emit baseband signals. Indeed, components other than memory or processors (e.g., other components of device 1200 shown in FIG. 12) of devices 28 or 34 may emit baseband signals 36 or 37 that may be intercepted by, or interception may be attempted by, nefarious actors using a 'sniffer' device as described elsewhere herein. Thus, the embodiment shown in FIGS. 4A and 4B is not meant to be limiting with respect to a processor emitting a baseband signal 36 when transmitter/transceiver 40 is located within housing 33 of device 28 or 34 and the embodiment shown in FIGS. 5A and 5B is not meant to be limiting with respect to a memory emitting baseband signal 37 when transmitter/transceiver 40 is located outside of housing 33 of a device 28 or 34.

Figure 6A:
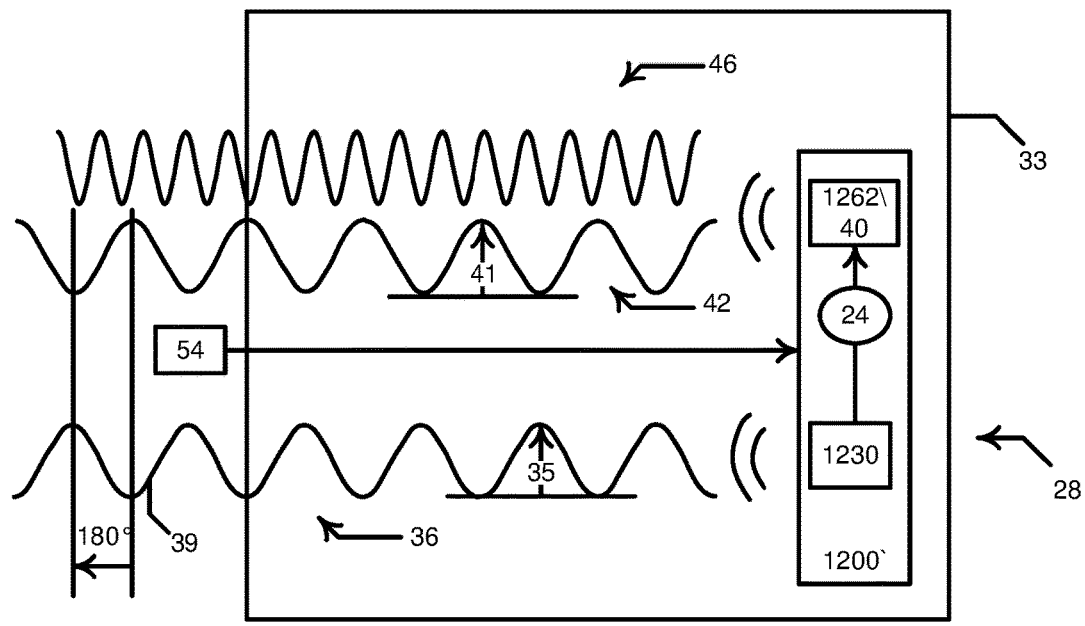
FIG. 6A illustrates an embodiment IoT device with a transmitter to attenuate a baseband signal and to transmit an upconverted version of the baseband signal.
Figure 6B:
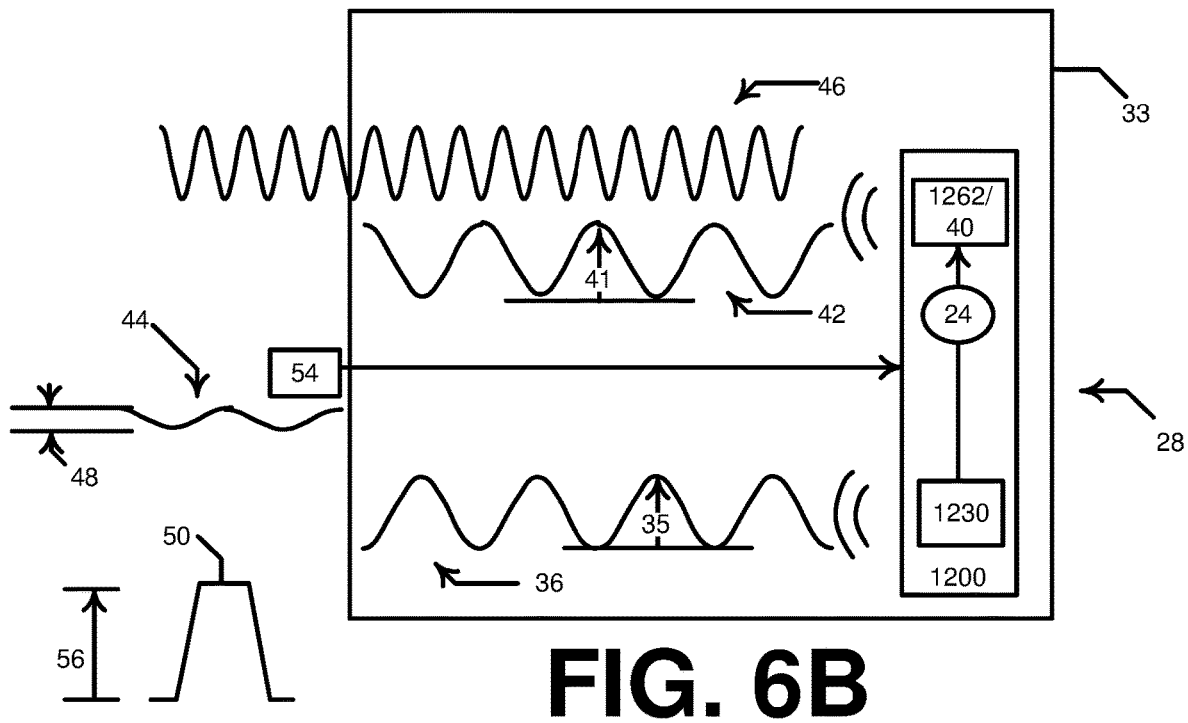
FIG. 6B illustrates the embodiment IoT device of FIG. 6A with a baseband signal thereof having been attenuated.

Turning now to FIG. 6A, an embodiment of a wireless communication device 28 is described that comprises transceiver 1262 and processor 1230. Processor 1230 communicates information 24 to transceiver 1262 for transmission via an upconverted signal 46 at an upconverted frequency according to a wireless communication protocol that may correspond to 5G or similar radio transmission to a wireless communication node, such as, for example, local node 8 or RAN node 105 as shown in FIG. 1. Processor 1232 emits baseband signal 36 based on, for example, a processor clock speed. Baseband signal 36 is shown being emitted by processor 1232 at a first amplitude 35. Instead of transmitter/transceiver 40 located inside a housing of device 28 as shown and described in reference to FIGS. 4A and 4B, and instead of transmitter receiver 40 being located outside of a housing of device 28 or 34, as shown and described in reference to FIGS. 5A and 5B, transceiver 1232 is also transmitter/transceiver 40. Instead of a separate transmitter/transceiver 40, transceiver 1232 may perform functionality described elsewhere herein in reference to transmitter/transceiver 40, which may be referred to as a first transmitter, or a first transceiver. In FIG. 6A, transceiver 1232 may also perform functionality of transmitting upconverted signal 46. Thus, in the embodiment shown in FIG. 6A, transceiver 1232 may be referred to as a first transceiver and as a second transceiver. FIG. 6B illustrates similar operations and the results thereof as described in reference to FIG. 4B insofar as transmission of coherent signal 42 attenuates an amplitude of baseband signal 36 at a distance, which may be referred to as a second distance at which a nefarious 'sniffing' device may be attempting to detect baseband signal information emitted from wireless communication device 28.

Figure 11:
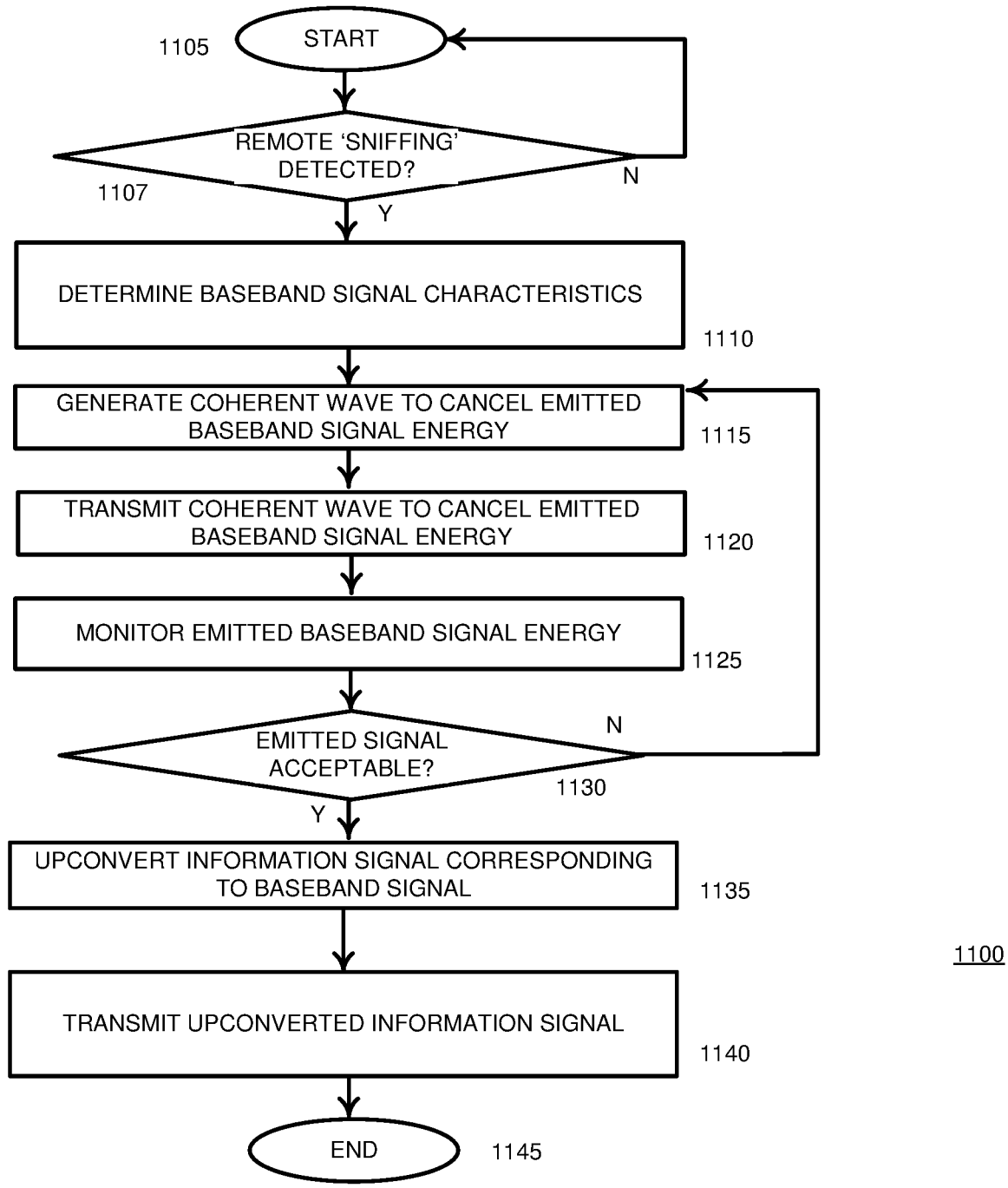
FIG. 11 illustrates a flow diagram of an example method to facilitate attenuating a baseband signal generated by a wireless communication device.

Turning now to FIG. 11, the figure illustrates a flow diagram of an embodiment method 1100 to attenuate a signal generated by a component of a wireless communication device, such as an IoT device. Method 1100 begins at step 1105. At act 1107 a determination is made whether a sniffing device, or sniffing activity, which may be attempting to detect baseband signal energy from a wireless communication device, is occurring. If a determination is made that sniffing activity is not detected method 1100 returns to act 1105. If, however, a determination is made that a sniffing device, or activity performed by a sniffing device, is attempting to detect baseband signal energy from the wireless communication devices at step 1107, method 1100 advances to act 1110. At act 1110, a determination is made of baseband signal characteristics. For example, characteristics determined at act 1110 may comprise a frequency or a phase of a baseband signal being emitted from a component of the wireless communication device may be determined. The determination may include a manual configuration based on a known clock speed, for example a clock speed of a processor or a clock speed of a memory, or the determination, at act 1110, may be performed based on detection by a sensor of the wireless communication device that detects the baseband signal energy.

At act 1115, a coherent wave, or signal, is generated to cancel the emitted baseband signal energy. For example, the coherent wave/signal may be generated by a transmitter of the wireless communication device or by a processor of the wireless communication device at a frequency of the baseband signal that was detected or determined at act 1110 and at a first phase of the baseband signal energy that was detected or determined at act 1110. At act 1120, the coherent wave or signal generated at 1115 is transmitted by a transmitter or a transceiver. The transmitter or transceiver may be separate from or may be a component of the wireless communication device from which the baseband signal energy is emitted. In an embodiment, the transceiver or transmitter that transmits the coherent wave to cancel the emitted baseband signal energy may be located externally with respect to the wireless communication device, or a housing thereof, from which the baseband signal energy was emitted or is emitted.

At act 1130, an amplitude of a reduced amplitude signal of the emitted baseband signal energy may be detected by a detector device that is internal to or external to the wireless communication device from which the baseband signal energy was emitted. An indication of an amplitude, or reduced amplitude, of the baseband signal energy may be fed back to a processor of the wireless communication device from which the baseband signal energy is omitted. If the amplitude, or reduced amplitude, of the baseband signal energy is within a specified tolerance, or satisfies a configured or determined criterion or criteria, method 1100 advances to act 1135. At act 1135, a signal communicating information that may have been contained in the baseband signal energy is upconverted to a second frequency and is transmitted by a transceiver of the wireless communication device at an upconverted frequency, or the second frequency, at act 1140. Method 1100 ends at act 1145.

Returning to discussion of act 1130, a determination of a criterion or criteria, or a reduced amplitude criterion or criteria, may be based on detection of a noise signal. If the noise signal has an amplitude that is higher than the reduced amplitude signal of the baseband signal energy, then a determination may be made that the reduced amplitude of the baseband signal energy is acceptable because sniffing activity would likely not be able to detect the baseband signal energy due to the noise level being higher than the detected, or detectable, baseband signal energy. If, however, a determination is made that detected noise energy is not higher than a reduced amplitude of the baseband signal energy, method 1100 may return to act 1115 where adjustments may be made to a phase or amplitude of a coherent signal to better reduce, or further reduce, the reduced amplitude that may be detected of baseband signal energy relative to noise. Accordingly, determination and transmission of the coherent wave, or signal, to cancel the original, or baseband, signal beyond a first distance, which may corresponds to a housing of the wireless communication device, may, in effect, form a virtual Faraday cage that allows the upconverted signal to escape the 'Faraday cage', but that does not allow the baseband signal, or baseband signal energy corresponding thereto, to propagate to a second distance where the baseband signal energy can be detected by a nefarious actor using a signal 'sniffing' device'.

Figure 7:
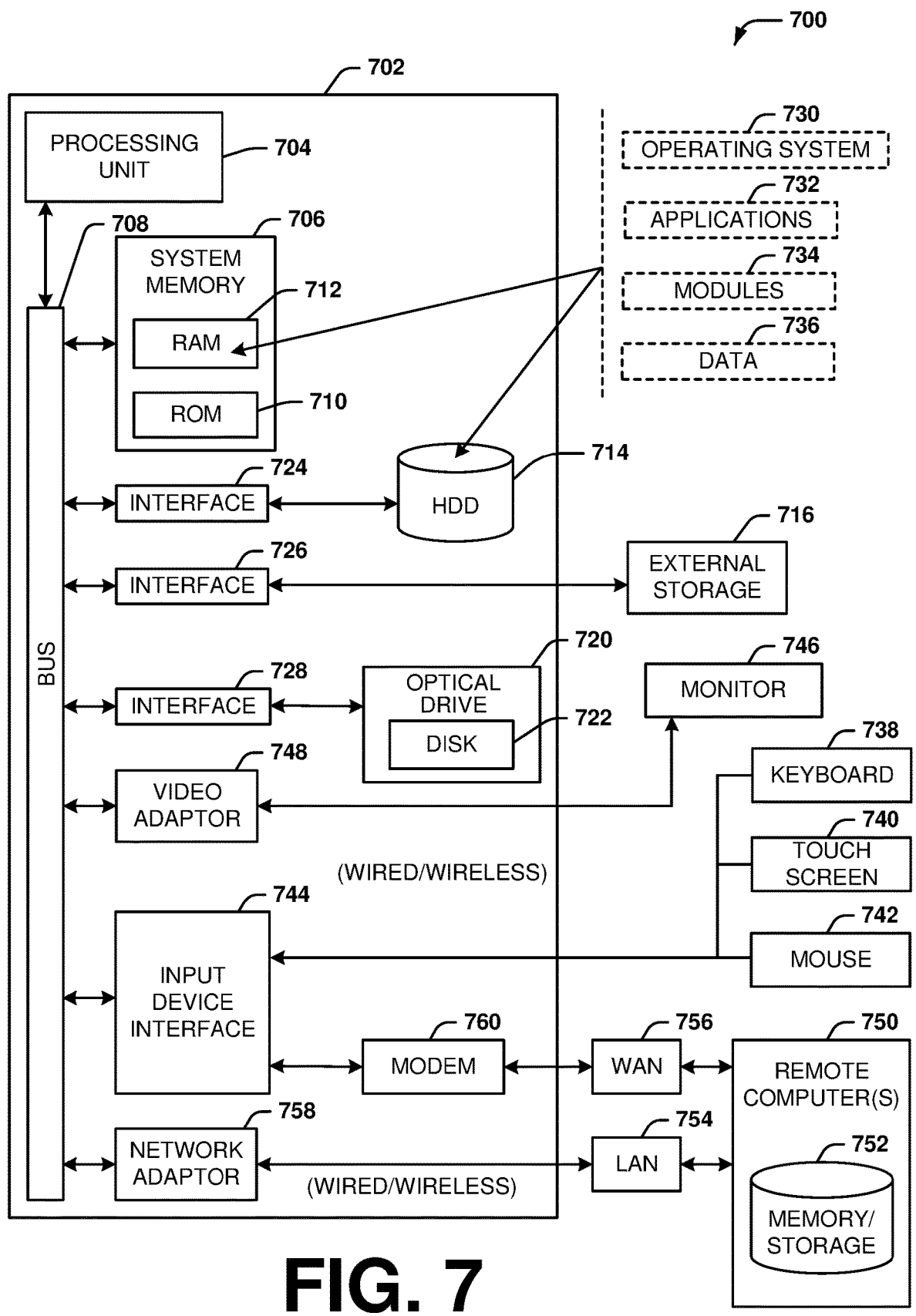
FIG. 7 illustrates a computer environment.

In order to provide additional context for various embodiments described herein, FIG. 7 and the following discussion are intended to provide a brief, general description of a suitable computing environment 700 in which various embodiments of the embodiment described herein can be implemented. While embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, IoT devices, distributed computing systems, as well as personal computers, hand-held computing devices, microprocessor-based or programmable consumer electronics, and the like, each of which can be operatively coupled to one or more associated devices.

The embodiments illustrated herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 7, the example environment 700 for implementing various embodiments of the aspects described herein includes a computer 702, the computer 702 including a processing unit 704, a system memory 706 and a system bus 708. The system bus 708 couples system components including, but not limited to, the system memory 706 to the processing unit 704. The processing unit 704 can be any of various commercially available processors and may include a cache memory. Dual microprocessors and other multi-processor architectures can also be employed as the processing unit 704.

The system bus 708 can be any of several types of bus structure that can further interconnect to a memory bus (with or without a memory controller), a peripheral bus, and a local bus using any of a variety of commercially available bus architectures. The system memory 706 includes ROM 710 and RAM 712. A basic input/output system (BIOS) can be stored in a non-volatile memory such as ROM, erasable programmable read only memory (EPROM), EEPROM, which BIOS contains the basic routines that help to transfer information between elements within the computer 702, such as during startup. The RAM 612 can also include a high-speed RAM such as static RAM for caching data.

Computer 702 further includes an internal hard disk drive (HDD) 714 (e.g., EIDE, SATA), one or more external storage devices 716 (e.g., a magnetic floppy disk drive (FDD) 716, a memory stick or flash drive reader, a memory card reader, etc.) and an optical disk drive 720 (e.g., which can read or write from a CD-ROM disc, a DVD, a BD, etc.). While the internal HDD 714 is illustrated as located within the computer 702, the internal HDD 714 can also be configured for external use in a suitable chassis (not shown). Additionally, while not shown in environment 700, a solid-state drive (SSD) could be used in addition to, or in place of, an HDD 714. The HDD 714, external storage device(s) 716 and optical disk drive 720 can be connected to the system bus 708 by an HDD interface 724, an external storage interface 726 and an optical drive interface 728, respectively. The interface 724 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 702, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 712, including an operating system 730, one or more application programs 732, other program modules 734 and program data 736. All or portions of the operating system, applications, modules, and/or data can also be cached in the RAM 712. The systems and methods described herein can be implemented utilizing various commercially available operating systems or combinations of operating systems.

Computer 702 can optionally comprise emulation technologies. For example, a hypervisor (not shown) or other intermediary can emulate a hardware environment for operating system 730, and the emulated hardware can optionally be different from the hardware illustrated in FIG. 7. In such an embodiment, operating system 730 can comprise one virtual machine (VM) of multiple VMs hosted at computer 702. Furthermore, operating system 730 can provide runtime environments, such as the Java runtime environment or the .NET framework, for applications 732. Runtime environments are consistent execution environments that allow applications 732 to run on any operating system that includes the runtime environment. Similarly, operating system 730 can support containers, and applications 732 can be in the form of containers, which are lightweight, standalone, executable packages of software that include, e.g., code, runtime, system tools, system libraries and settings for an application.

Further, computer 702 can comprise a security module, such as a trusted processing module (TPM). For instance, with a TPM, boot components hash next in time boot components, and wait for a match of results to secured values, before loading a next boot component. This process can take place at any layer in the code execution stack of computer 602, e.g., applied at the application execution level or at the operating system (OS) kernel level, thereby enabling security at any level of code execution.

A user can enter commands and information into the computer 702 through one or more wired/wireless input devices, e.g., a keyboard 738, a touch screen 740, and a pointing device, such as a mouse 742. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 704 through an input device interface 744 that can be coupled to the system bus 708, but can be connected by other interfaces, such as a parallel port, an IEEE 1394 serial port, a game port, a USB port, an IR interface, a BLUETOOTH® interface, etc.

A monitor 746 or other type of display device can be also connected to the system bus 608 via an interface, such as a video adapter 748. In addition to the monitor 746, a computer typically includes other peripheral output devices (not shown), such as speakers, printers, etc.

The computer 702 can operate in a networked environment using logical connections via wired and/or wireless communications to one or more remote computers, such as a remote computer(s) 750. The remote computer(s) 750 can be a workstation, a server computer, a router, a personal computer, portable computer, microprocessor-based entertainment appliance, a peer device or other common network node, and typically includes many or all of the elements described relative to the computer 702, although, for purposes of brevity, only a memory/storage device 752 is illustrated. The logical connections depicted include wired/wireless connectivity to a local area network (LAN) 754 and/or larger networks, e.g., a wide area network (WAN) 756. Such LAN and WAN networking environments are commonplace in offices and companies, and facilitate enterprise-wide computer networks, such as intranets, all of which can connect to a global communications network, e.g., the internet.

When used in a LAN networking environment, the computer 702 can be connected to the local network 754 through a wired and/or wireless communication network interface or adapter 758. The adapter 758 can facilitate wired or wireless communication to the LAN 754, which can also include a wireless access point (AP) disposed thereon for communicating with the adapter 758 in a wireless mode.

When used in a WAN networking environment, the computer 702 can include a modem 760 or can be connected to a communications server on the WAN 756 via other means for establishing communications over the WAN 756, such as by way of the internet. The modem 760, which can be internal or external and a wired or wireless device, can be connected to the system bus 708 via the input device interface 744. In a networked environment, program modules depicted relative to the computer 702 or portions thereof, can be stored in the remote memory/storage device 752. It will be appreciated that the network connections shown are example and other means of establishing a communications link between the computers can be used.

When used in either a LAN or WAN networking environment, the computer 702 can access cloud storage systems or other network-based storage systems in addition to, or in place of, external storage devices 716 as described above. Generally, a connection between the computer 702 and a cloud storage system can be established over a LAN 754 or WAN 756 e.g., by the adapter 758 or modem 760, respectively. Upon connecting the computer 702 to an associated cloud storage system, the external storage interface 726 can, with the aid of the adapter 758 and/or modem 760, manage storage provided by the cloud storage system as it would other types of external storage. For instance, the external storage interface 726 can be configured to provide access to cloud storage sources as if those sources were physically connected to the computer 702.

The computer 702 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Turning now to FIG. 12, the figure illustrates a block diagram of an example UE 1260. UE 1260 may comprise a smart phone, a wireless tablet, a laptop computer with wireless capability, a wearable device, a machine device that may facilitate vehicle telematics, and the like. UE 1260 comprises a first processor 1230, a second processor 1232, and a shared memory 1234. UE 1260 includes radio front end circuitry 1262, which may be referred to herein as a transceiver, but is understood to typically include transceiver circuitry, separate filters, and separate antennas for facilitating transmission and receiving of signals over a wireless link, such as one or more wireless links shown in FIG. 1. Furthermore, transceiver 1262 may comprise multiple sets of circuitry or may be tunable to accommodate different frequency ranges, different modulations schemes, or different communication protocols, to facilitate long-range wireless links, device-to-device wireless links, and short-range wireless links.

Continuing with description of FIG. 12, UE 1260 may also include a subscriber identity module (SIM) 1264, or a SIM profile, which may comprise information stored in a memory (memory 1234 or a separate memory portion), for facilitating wireless communication with a RAN 105 or a core network component. FIG. 12 shows SIM 1264 as a single component in the shape of a conventional SIM card, but it will be appreciated that SIM 1264 may represent multiple SIM cards, multiple SIM profiles, or multiple electronic SIMs (eSIMs), some or all of which may be implemented in hardware or software. It will be appreciated that a SIM profile may comprise information such as security credentials (e.g., encryption keys, values that may be used to generate encryption keys, or shared values that are shared between SIM 1264 and another device, which may be a component of RAN 105 or a core network). A SIM profile 1264 may also comprise identifying information that is unique to the SIM, or SIM profile, such as, for example, an International Mobile Subscriber Identity ("IMSI") or information that may make up an IMSI.

SIM 1264 is shown coupled to both the first processor portion 1230 and the second processor portion 1232. Such an implementation may provide an advantage that first processor portion 1230 may not need to request or receive information or data from SIM 1264 that second processor 1232 may request, thus eliminating the use of the first processor acting as a 'go-between' when the second processor uses information from the SIM in performing its functions and in executing applications. First processor 1230, which may be a modem processor or baseband processor, is shown smaller than processor 1232, which may be a more sophisticated application processor, to visually indicate the relative levels of sophistication (i.e., processing capability and performance) and corresponding relative levels of operating power consumption levels between the two processor portions. Keeping the second processor portion 1232 asleep/inactive/in a low power state when UE 1260 does not need it for executing applications and processing data related to an application provides an advantage of reducing power consumption when the UE only needs to use the first processor portion 1230 while in listening mode for monitoring routine configured bearer management and mobility management/maintenance procedures, or for monitoring search spaces that the UE has been configured to monitor while the second processor portion remains inactive/asleep.

UE 1260 may also include sensors 1266, such as, for example, temperature sensors, accelerometers, gyroscopes, barometers, moisture sensors, Global Positioning Satellite circuitry, and the like that may provide signals to the first processor 1230 or second processor 1232. Output devices 1268 may comprise, for example, one or more visual displays (e.g., computer monitors, VR appliances, and the like), acoustic transducers, such as speakers or microphones, vibration components, and the like. Output devices 1268 may comprise software that interfaces with output devices, for example, visual displays, speakers, microphones, touch sensation devices, smell or taste devices, and the like, that are external to UE 1260.

Figure 8:
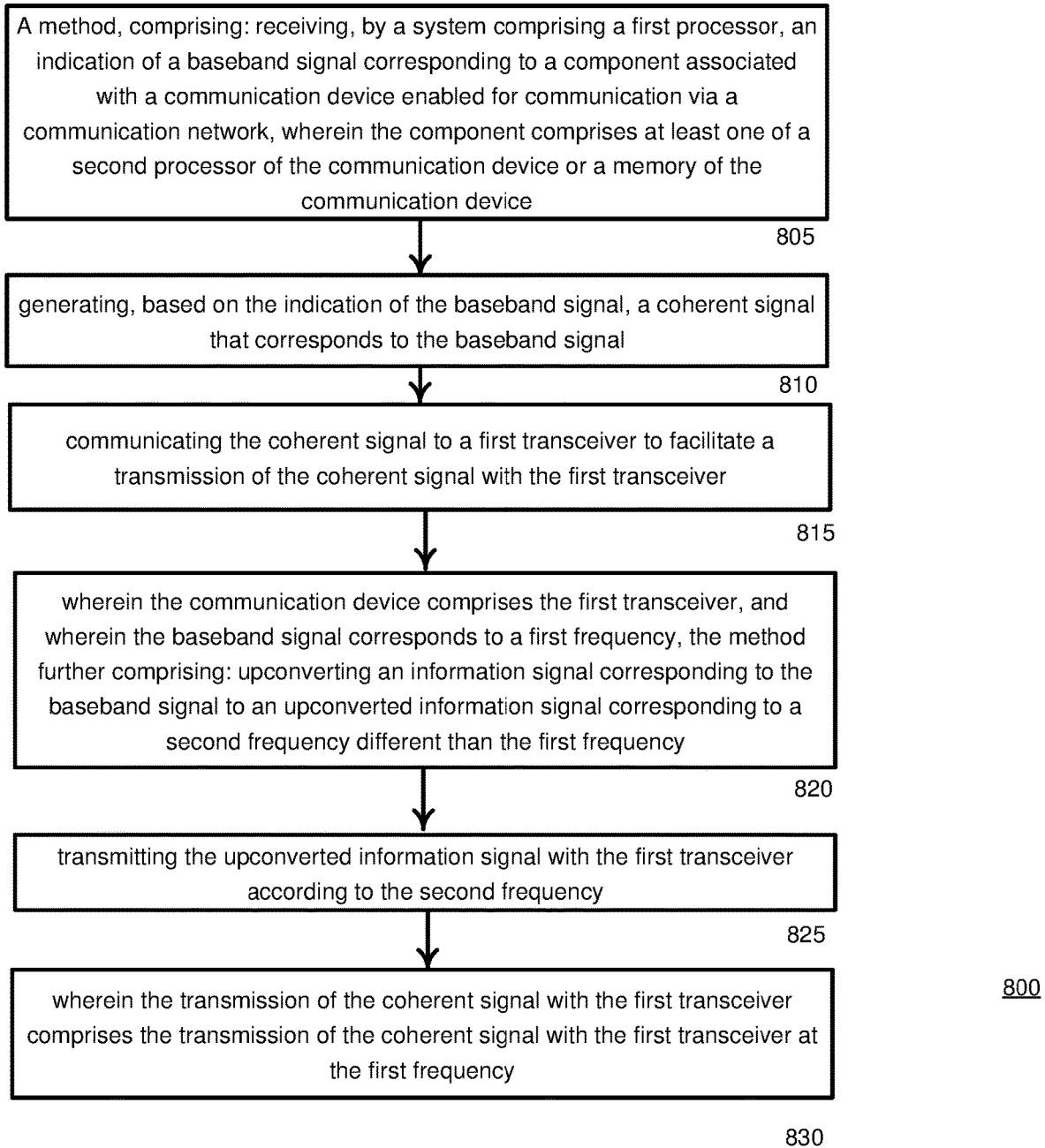
FIG. 8 illustrates a block diagram of an example method.

Turning now to FIG. 8, the figure illustrates an example method 800 comprising, at block 805, receiving, by a system comprising a first processor, an indication of a baseband signal corresponding to a component associated with a communication device enabled for communication via a communication network, wherein the component comprises at least one of a second processor of the communication device or a memory of the communication device; at block 810, generating, based on the indication of the baseband signal, a coherent signal that corresponds to the baseband signal; at block 815, communicating the coherent signal to a first transceiver to facilitate a transmission of the coherent signal with the first transceiver; at block 820, wherein the communication device comprises the first transceiver, and wherein the baseband signal corresponds to a first frequency, the method further comprising: upconverting an information signal corresponding to the baseband signal to an upconverted information signal corresponding to a second frequency different than the first frequency; at block 825, transmitting the upconverted information signal with the first transceiver according to the second frequency; and, at block 830, wherein the transmission of the coherent signal with the first transceiver comprises the transmission of the coherent signal with the first transceiver at the first frequency.

Figure 9:
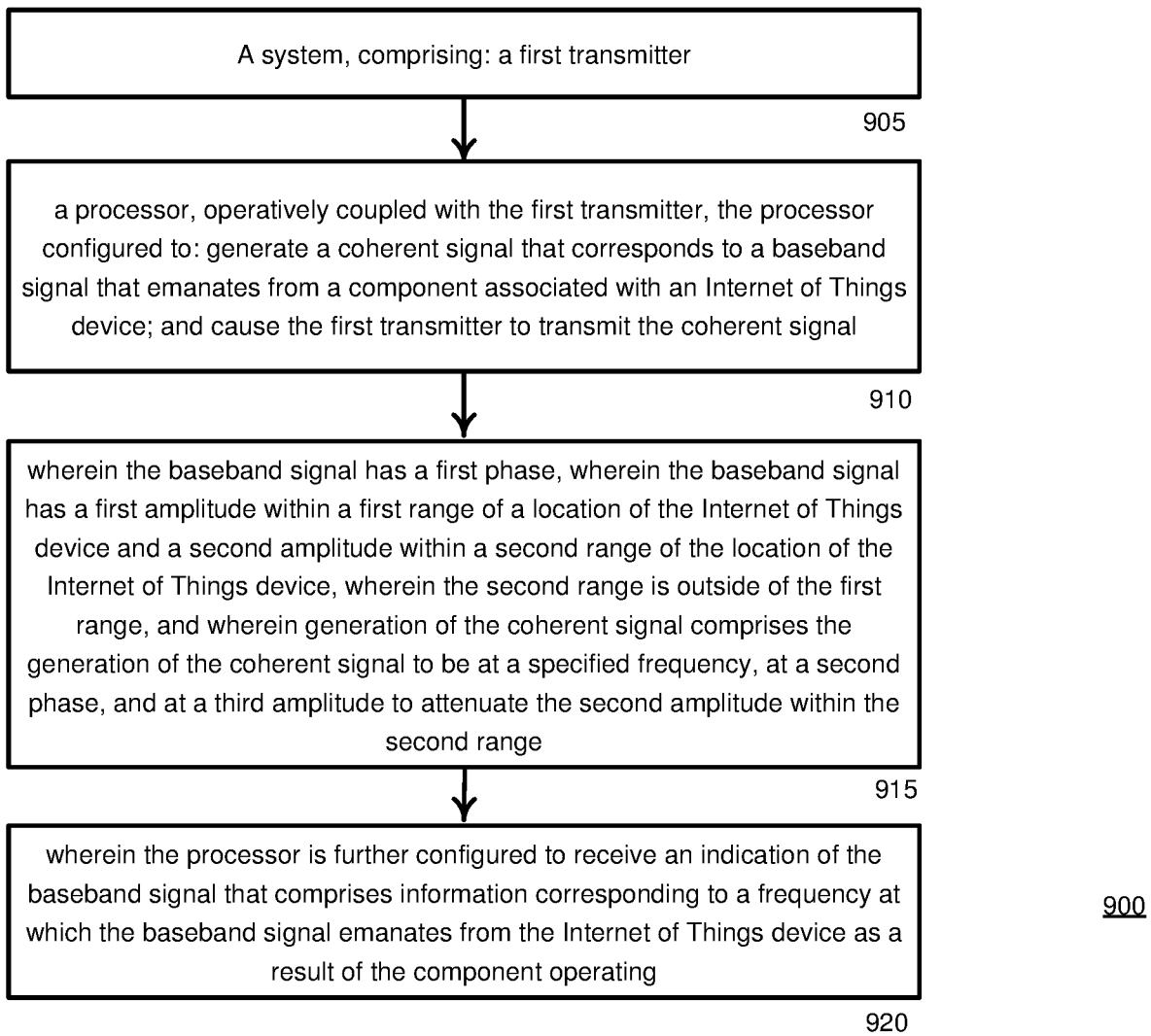
FIG. 9 illustrates a block diagram of an example system.

Turning now to FIG. 9, the figure illustrates an example system 900, comprising at block 905, a first transmitter; at block 910, a processor, operatively coupled with the first transmitter, the processor configured to: generate a coherent signal that corresponds to a baseband signal that emanates from a component associated with an Internet of Things device; and cause the first transmitter to transmit the coherent signal; at block 915, wherein the baseband signal has a first phase, wherein the baseband signal has a first amplitude within a first range of a location of the Internet of Things device and a second amplitude within a second range of the location of the Internet of Things device, wherein the second range is outside of the first range, and wherein generation of the coherent signal comprises the generation of the coherent signal to be at a specified frequency, at a second phase, and at a third amplitude to attenuate the second amplitude within the second range; and at block 920, wherein the processor is further configured to receive an indication of the baseband signal that comprises information corresponding to a frequency at which the baseband signal emanates from the Internet of Things device as a result of the component operating.

Figure 10:
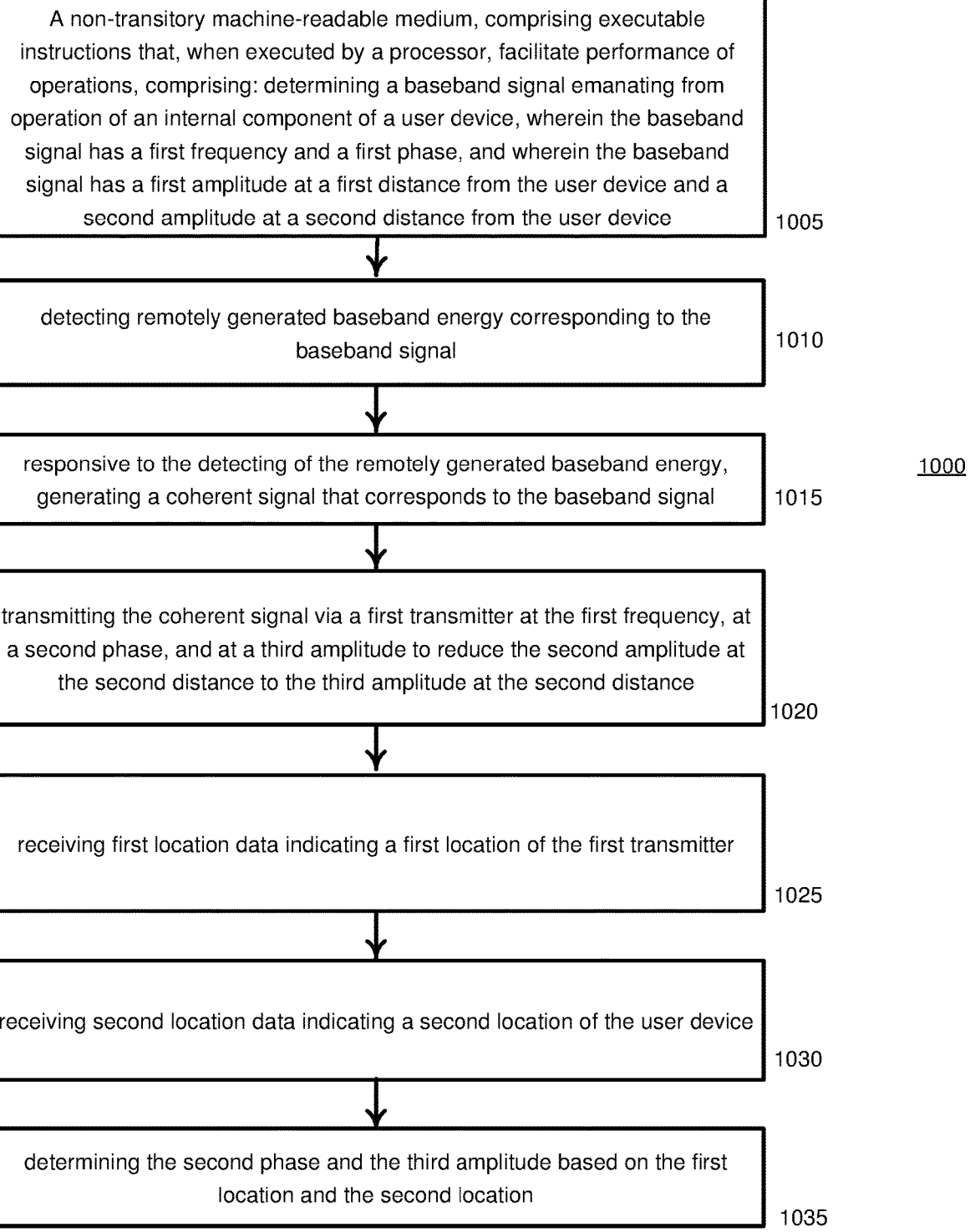
FIG. 10 illustrates a block diagram of an example non-transitory machine-readable medium.

Turning now to FIG. 10, the figure illustrates a method 1000 comprising at block 1005, a non-transitory machine-readable medium, comprising executable instructions that, when executed by a processor, facilitate performance of operations, comprising: determining a baseband signal emanating from operation of an internal component of a user device, wherein the baseband signal has a first frequency and a first phase, and wherein the baseband signal has a first amplitude at a first distance from the user device and a second amplitude at a second distance from the user device; at block 1010, detecting remotely generated baseband energy corresponding to the baseband signal; at block 1015, responsive to the detecting of the remotely generated baseband energy, generating a coherent signal that corresponds to the baseband signal; at block 1020, transmitting the coherent signal via a first transmitter at the first frequency, at a second phase, and at a third amplitude to reduce the second amplitude at the second distance to the third amplitude at the second distance; at block 1025, receiving first location data indicating a first location of the first transmitter; at block 1030, receiving second location data indicating a second location of the user device; and, at block 1035, determining the second phase and the third amplitude based on the first location and the second location.

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above-described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" or variations thereof as may be used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
receiving, by a system comprising a first processor, an indication of a baseband signal corresponding to a component associated with a communication device enabled for communication via a communication network, wherein the component comprises at least one of a second processor of the communication device or a memory of the communication device;

generating, based on the indication of the baseband signal, a coherent signal that corresponds to the baseband signal; and communicating the coherent signal to a first transceiver to facilitate a transmission of the coherent signal with the first transceiver.

2. The method of claim 1, wherein the component is the second processor of the communication device, and wherein the baseband signal emanates from the second processor.

3. The method of claim 1, wherein the component is the memory of the communication device, and wherein the baseband signal emanates from the memory.

4. The method of claim 1, wherein the communication device comprises the first transceiver, and wherein the baseband signal corresponds to a first frequency, the method further comprising:

upconverting an information signal corresponding to the baseband signal to an upconverted information signal corresponding to a second frequency different than the first frequency; and transmitting the upconverted information signal with the first transceiver according to the second frequency, wherein the transmission of the coherent signal with the first transceiver comprises the transmission of the coherent signal with the first transceiver at the first frequency.

5. The method of claim 4, wherein the baseband signal corresponds to a first phase, wherein the baseband signal has a first amplitude within a first proximity of the communication device and a second amplitude outside of the first proximity and within a second proximity of the communication device, wherein the first amplitude is different than the second amplitude, wherein the first proximity is closer than the second proximity, and wherein the transmission of the coherent signal with the first transceiver comprises the transmission of the coherent signal with the first transceiver at a third amplitude, different than the first amplitude and the second amplitude, and at a second phase, different than the first phase, that results in a reduction of the second amplitude within the second proximity to a reduced second amplitude within the second proximity that is less than the second amplitude within the second proximity.

6. The method of claim 5, wherein the first proximity is defined by a first volume of space inside a housing of the communication device, and wherein the second proximity is defined by a second volume of space outside the housing of the communication device.

7. The method of claim 5, wherein the transmission of the coherent signal comprises the transmission of the coherent signal with the first transceiver from within the first proximity.

8. The method of claim 6, wherein the transmission of the coherent signal comprises a directional transmission of the coherent signal in a specified direction to result in a directional attenuation of the baseband signal, and to result in the baseband signal having a fourth amplitude within a third volume of space of the second proximity that is different than the second amplitude within the second proximity and the reduced second amplitude within the second proximity.

9. The method of claim 1, wherein a transmitter device separate from the communication device comprises the first transceiver, and wherein the communication device comprises a second transceiver, the method further comprising:

upconverting an information signal corresponding to the baseband signal to an upconverted information signal having a second frequency; and transmitting the upconverted information signal with the second transceiver according to the second frequency, wherein the transmission of the coherent signal with the first transceiver comprises the transmission of the coherent signal with the first transceiver at the first frequency.

10. The method of 9, wherein the transmitter device is outside of a housing of the communication device.

11. A system, comprising:

a transmitter;

a receiver; and a processor, operatively coupled with the transmitter and the receiver, the processor configured to:

based on electromagnetic signal energy detected by the receiver, generate a coherent signal that corresponds to a baseband signal that emanates from a component associated with an Internet of Things device; and cause the transmitter to transmit the coherent signal.

12. The system of claim 11, wherein the system is the Internet of Things device, and wherein the component is at least one of a processor or a memory of the Internet of Things device.

13. The system of claim 11, wherein the system is an attenuating device that is separate from the Internet of Things device, and wherein the component is at least one of a processor or a memory of the Internet of Things device.

14. The system of claim 11, wherein the baseband signal has a first phase, wherein the baseband signal has a first amplitude within a first range of a location of the Internet of Things device and a second amplitude within a second range of the location of the Internet of Things device, wherein the second range is outside of the first range, and wherein generation of the coherent signal comprises the generation of the coherent signal to be at a specified frequency, at a second phase, and at a third amplitude to attenuate the second amplitude within the second range.

15. The system of claim 11, wherein the processor is further configured to receive an indication of the baseband signal that comprises information corresponding to a frequency at which the baseband signal emanates from the Internet of Things device as a result of the component operating.

16. A non-transitory machine-readable medium, comprising executable instructions that, when executed by a processor, facilitate performance of operations, comprising:

determining a baseband signal emanating from operation of an internal component of a user device, wherein the baseband signal has a first frequency and a first phase, and wherein the baseband signal has a first amplitude at a first distance from the user device and a second amplitude at a second distance from the user device;

detecting remotely generated baseband energy corresponding to the baseband signal;

responsive to the detecting of the remotely generated baseband energy, generating a coherent signal that corresponds to the baseband signal; and transmitting the coherent signal via a first transmitter at the first frequency, at a second phase, and at a third amplitude to reduce the second amplitude at the second distance to the third amplitude at the second distance.

17. The non-transitory machine-readable medium of claim 16, wherein the operations further comprise:

upconverting the baseband signal to result in an upconverted information signal having a second frequency;

transmitting the upconverted information signal via the first transmitter according to the second frequency; and transmitting the coherent signal via the first transmitter at the first frequency,
wherein the user device comprises the first transmitter, the processor, and the internal component of the user device.

18. The non-transitory machine-readable medium of claim 16, wherein the internal component, of the user device, from which the baseband signal emanates is the processor, the operations further comprising:
determining the first frequency of the baseband signal based on a clock speed of the processor.

19. The non-transitory machine-readable medium of claim 16, the operations further comprising:
receiving first location data indicating a first location of the first transmitter;
receiving second location data indicating a second location of the user device; and
determining the second phase and the third amplitude based on the first location and the second location.

20. The non-transitory machine-readable medium of claim 16, wherein the user device comprises the first transmitter and a second transmitter, and wherein the operations further comprise:
upconverting the baseband signal to an upconverted baseband signal having a second frequency; and
transmitting the upconverted baseband signal at the second frequency via the second transmitter.

* * * * *